United States Patent
Huang et al.

(10) Patent No.: US 10,173,200 B2
(45) Date of Patent: Jan. 8, 2019

(54) CERIUM-ZIRCONIUM COMPOSITE OXIDE, PREPARATION METHOD THEREFOR, AND APPLICATION OF CATALYST

(71) Applicant: GRIREM ADVANCED MATERIALS CO., LTD., Beijing (CN)

(72) Inventors: Xiaowei Huang, Beijing (CN); Qi Wang, Beijing (CN); Mei Yue, Beijing (CN); Qiang Zhong, Beijing (CN); Lei Wang, Beijing (CN); Yongke Hou, Beijing (CN); Meisheng Cui, Beijing (CN)

(73) Assignee: GRIREM ADVANCED MATERIALS CO., LTD., Beijing (CN)

( * ) Notice: Subject to any disclaimer, the term of this patent is extended or adjusted under 35 U.S.C. 154(b) by 0 days.

(21) Appl. No.: 15/546,152

(22) PCT Filed: Jan. 26, 2016

(86) PCT No.: PCT/CN2016/072202
§ 371 (c)(1),
(2) Date: Jul. 25, 2017

(87) PCT Pub. No.: WO2016/127802
PCT Pub. Date: Aug. 18, 2016

(65) Prior Publication Data
US 2018/0021759 A1   Jan. 25, 2018

(30) Foreign Application Priority Data
Feb. 9, 2015 (CN) .......................... 2015 1 0067084

(51) Int. Cl.
*B01J 21/06* (2006.01)
*B01J 23/10* (2006.01)
(Continued)

(52) U.S. Cl.
CPC .............. *B01J 23/83* (2013.01); *B01D 53/86* (2013.01); *B01D 53/94* (2013.01); *B01J 23/10* (2013.01);
(Continued)

(58) Field of Classification Search
CPC . B01J 21/066; B01J 23/10; B01J 23/34; B01J 23/83; B01J 35/0013; B01J 35/06;
(Continued)

(56) References Cited

U.S. PATENT DOCUMENTS 5,260,249 A * 11/1993 Shiraishi .............. B01D 53/945
423/213.5
5,854,158 A * 12/1998 Nawa ................... C04B 35/4885
264/604

(Continued)

FOREIGN PATENT DOCUMENTS

| CN | 101074490 A | 11/2007 |
|----|-------------|---------|
| CN | 102513085 A | 6/2012 |
| JP | 2001348223 A | 12/2001 |

*Primary Examiner* — Cam N. Nguyen
(74) *Attorney, Agent, or Firm* — James D. Miller; Shumaker, Loop & Kendrick, LLP

(57) ABSTRACT

Provided are a cerium-zirconium composite oxide, a preparation method therefor and application of a catalyst. The cerium-zirconium composite oxide has a composite phase structure, and comprises a cerium oxide phase and a cerium-zirconium solid solution phase, or consists of two or more cerium-zirconium solid solution phases with different crystal structures and different chemical compositions, wherein the chemical formula of the cerium-zirconium solid solution phase is $Ce_xZr_{1-x-y}M_yO_2$, where M is at least one selected from the group consisting of a rare earth element other than cerium, a transition metal element and an alkaline earth metal element, x is 15-85 mol %, and y is 0-20 mol %.

19 Claims, 2 Drawing Sheets

(51) Int. Cl.
| | |
|---|---|
| *B01J 23/34* | (2006.01) |
| *B01J 23/83* | (2006.01) |
| *B01J 35/00* | (2006.01) |
| *B01J 35/06* | (2006.01) |
| *B01J 35/08* | (2006.01) |
| *B01J 35/10* | (2006.01) |
| *B01J 37/00* | (2006.01) |
| *B01J 37/02* | (2006.01) |
| *B01J 37/03* | (2006.01) |
| *B01J 37/04* | (2006.01) |
| *B01J 37/10* | (2006.01) |
| *B01D 53/94* | (2006.01) |
| *B01D 53/86* | (2006.01) |
| *B01J 23/63* | (2006.01) |
| *B01J 35/02* | (2006.01) |

(52) U.S. Cl.
CPC .............. *B01J 23/34* (2013.01); *B01J 23/63* (2013.01); *B01J 35/0013* (2013.01); *B01J 35/026* (2013.01); *B01J 35/06* (2013.01); *B01J 35/08* (2013.01); *B01J 35/1014* (2013.01); *B01J 37/03* (2013.01); *B01J 37/038* (2013.01); *B01J 37/04* (2013.01); *B01J 37/10* (2013.01); *B01D 2255/407* (2013.01); *B01J 37/009* (2013.01); *B01J 37/0236* (2013.01); *B01J 2523/00* (2013.01)

(58) Field of Classification Search
CPC ...... B01J 35/08; B01J 35/1014; B01J 37/009; B01J 37/0236; B01J 37/038; B01J 37/04; B01J 37/10
See application file for complete search history.

(56) References Cited

U.S. PATENT DOCUMENTS

| | | | | |
|---|---|---|---|---|
| 5,958,827 A * | 9/1999 | Suda | ............ | B01D 53/945 502/300 |
| 6,214,306 B1 * | 4/2001 | Aubert | ............ | B01D 53/945 423/213.2 |
| 6,228,799 B1 * | 5/2001 | Aubert | ............ | B01D 53/945 423/239.1 |
| 6,261,989 B1 * | 7/2001 | Tanaka | ............ | B01D 53/945 29/890 |
| 6,326,329 B1 * | 12/2001 | Nunan | ............ | B01D 53/945 502/242 |
| 6,358,880 B1 * | 3/2002 | Hedouin | ............ | B01D 53/9422 423/212 |
| 6,458,741 B1 * | 10/2002 | Roark | ............ | A62D 3/38 423/245.3 |
| 6,528,451 B2 * | 3/2003 | Brezny | ............ | B01D 53/945 423/263 |
| 6,585,944 B1 * | 7/2003 | Nunan | ............ | B01D 53/945 423/239.1 |
| 6,797,668 B2 * | 9/2004 | Yoshikawa | ............ | B01D 53/945 502/302 |
| 6,808,687 B1 * | 10/2004 | Uenishi | ............ | B01D 53/945 422/177 |
| 7,166,263 B2 * | 1/2007 | Vanderspurt | ............ | B01J 23/002 423/263 |
| 7,202,194 B2 * | 4/2007 | Muhammed | ............ | B01D 53/945 502/304 |
| 7,767,617 B2 * | 8/2010 | Larcher | ............ | B01D 53/94 502/304 |
| 7,871,956 B2 * | 1/2011 | Wakita | ............ | B01D 53/945 423/593.1 |
| 7,939,040 B2 * | 5/2011 | Larcher | ............ | C01G 25/00 423/213.2 |
| 7,994,090 B2 * | 8/2011 | Beppu | ............ | B01J 23/002 502/202 |
| 8,187,995 B2 * | 5/2012 | Wakita | ............ | B01D 53/945 423/593.1 |
| 8,192,710 B2 * | 6/2012 | Larcher | ............ | C01G 25/00 423/263 |
| 8,460,626 B2 * | 6/2013 | Larcher | ............ | B01D 53/94 423/213.2 |
| 8,524,183 B2 * | 9/2013 | Ifrah | ............ | B01D 53/944 423/213.2 |
| 8,530,372 B2 * | 9/2013 | Luo | ............ | B01D 53/945 502/303 |
| 8,728,435 B2 * | 5/2014 | Larcher | ............ | B01D 53/945 423/594.12 |
| 9,012,353 B2 * | 4/2015 | Golden | ............ | F01N 3/101 502/258 |
| 2009/0325793 A1 * | 12/2009 | Takeshima | ............ | B01D 53/945 502/304 |
| 2010/0004123 A1 * | 1/2010 | Kimura | ............ | B01D 53/02 502/304 |
| 2010/0040523 A1 * | 2/2010 | Larcher | ............ | B01D 53/945 423/213.2 |
| 2011/0206583 A1 * | 8/2011 | Larcher | ............ | B01D 53/945 423/213.2 |
| 2012/0129690 A1 * | 5/2012 | Larcher | ............ | B01J 21/12 502/304 |
| 2013/0023410 A1 * | 1/2013 | Schoneborn | ............ | B01J 21/04 502/439 |
| 2013/0029840 A1 * | 1/2013 | Morikawa | ............ | B01J 35/04 502/304 |
| 2013/0336864 A1 * | 12/2013 | Zheng | ............ | B01J 23/63 423/213.5 |
| 2014/0044628 A1 * | 2/2014 | Ifrah | ............ | B01J 23/002 423/213.2 |
| 2014/0140910 A1 * | 5/2014 | Ifrah | ............ | B01J 23/10 423/213.2 |
| 2014/0147357 A1 * | 5/2014 | Ifrah | ............ | B01J 23/10 423/213.2 |
| 2014/0205522 A1 * | 7/2014 | Ifrah | ............ | B01J 23/10 423/213.2 |
| 2014/0323294 A1 * | 10/2014 | Nagao | ............ | B01J 23/34 502/304 |
| 2014/0369912 A1 * | 12/2014 | Zheng | ............ | B01J 23/63 423/213.5 |

* cited by examiner

CERIUM-ZIRCONIUM COMPOSITE OXIDE, PREPARATION METHOD THEREFOR, AND APPLICATION OF CATALYST

CROSS-REFERENCE TO RELATED PATENT APPLICATIONS

This patent application is a United States national phase patent application based on PCT/CN2016/072202 filed Jan. 26, 2016, which claims the benefit of Chinese Patent Application No. 201510067084.5 filed Feb. 9, 2015, the disclosures of which are hereby incorporated herein by reference in their entirety.

TECHNICAL FIELD

The present disclosure relates to the technical field of cerium-zirconium composite oxide, and more particularly to a cerium-zirconium composite oxide, a preparation method therefor, and application of a catalyst.

BACKGROUND

Since the domestic and international industrial waste gas, vehicle exhaust gas emission standards are more stringent, the requirement for the industrial waste gas and vehicle exhaust gas purification catalyst is getting higher and higher. As a source of mobile pollution, vehicles continuously change the exhaust gas components and properties in the course of running so that the ordinary catalyst is difficult to effectively purify the vehicle exhaust gas. Thus a vehicle exhaust gas purification catalyst and a motorcycle exhaust gas purification catalyst containing precious metals, such as platinum, palladium, rhodium, are developed. These catalysts use a key active coating material, that is, cerium-zirconium composite oxide material. The cerium oxide in the cerium-zirconium composite oxide has valence variability, and $Ce^{4+}$ and $Ce^{3+}$ change in the oxidizing or reducing atmosphere, so that the cerium-zirconium composite oxide has the function of storing oxygen, which can effectively expand the catalyst air-fuel ratio window and substantially increase the catalytic purification performance of vehicle exhaust gas catalyst. Cerium-zirconium composite oxide is used in automotive exhaust gas catalyst, which also needs to withstand the degradation temperature of higher exhaust gas so as to maintain the stability of the material structure and performance. Therefore, cerium-zirconium composite oxide with a high specific surface and an excellent performance is currently widely used in the vehicle exhaust gas purification catalyst, which has become an irreplaceable key material for the vehicle exhaust gas purification catalyst.

For catalysts prepared with cerium-zirconium composite oxide, the high specific surface is usually necessary. However, under the action of high temperature of automobile exhaust gas, the specific surface of cerium-zirconium composite oxide will decrease and the performance will deteriorate. In order to meet the more stringent vehicle exhaust gas emission standards, the development of cerium oxide zirconium composite oxide with a high specific surface, high stability, and high storage has become an inevitable trend. However, the high temperature stability of the cerium-zirconium composite oxide prepared by the prior art is still insufficient, thereby affecting the catalytic performance of the cerium-zirconium composite oxide. Patent CN101096012 (B) mentions cerium oxide and zirconium oxide-based mixed oxide for the purpose of improving the dispersibility of the precious metal platinum. The ratio of cerium oxide of such mixture species is 50 vol % or more, and such cerium-zirconium oxide has a poor anti-aging resistance. The ratio of cerium oxide is 80.6 vol % and the specific surface area is only 14.4 $m^2$/g when being aged at 1000° C. for 3 h. Patent CN101024513B reports a cerium-zirconium composite oxide having rod-like particles, but it does not precisely describe its mechanism for the formation of rod-like particles. The ratio of rod-like particles is not controllable, which greatly limits the stability of the product production and the consistency of the catalytic application effect.

SUMMARY

The main object of the present disclosure is to provide a cerium-zirconium composite oxide, a preparation method therefor, and application of a catalyst for improving the high temperature stability and catalytic application effect of the cerium-zirconium composite oxide.

In order to achieve the above object, according to one aspect of the present disclosure, a cerium-zirconium composite oxide is provided, wherein the cerium-zirconium composite oxide has a composite phase structure, and comprises a cerium oxide phase and a cerium-zirconium solid solution phase, wherein the chemical formula of the cerium-zirconium solid solution phase is $Ce_xZr_{1-x-y}M_yO_2$, where M is at least one selected from the group consisting of a rare earth element other than cerium, a transition metal element and an alkaline earth metal element, x is 15~85 mol %, and y is 0~20 mol %.

Further, after the cerium-zirconium composite oxide is subjected to heat preservation at 1000° C. for 4 hours, the cerium oxide phase has a proportion of 0.5~30 vol % in the cerium-zirconium composite oxide, preferably 3~20 vol %.

Further, the cerium-zirconium composite oxide comprises cerium oxide needle-like particles and cerium-zirconium solid solution near-spherical particles, and after being subjected to heat preservation at 1000° C. for 4 hours, the cerium oxide needle-like particles have a diameter of 7~20 nm and a length of 50~300 nm, the cerium-zirconium solid solution near-spherical particles have a diameter of 5~30 nm, and the cerium oxide needle-like particles have a volume ratio of 0.5~25% in the cerium-zirconium composite oxide.

Further, after being subjected to heat preservation at 1000° C. for 4 hours, the cerium-zirconium composite oxide has a pore size of 5~45 nm, preferably 10~40 nm, and after being subjected to heat preservation at 1000° C. for 4 hours, the cerium-zirconium composite oxide has a specific surface area of being more than 50 $m^2$/g.

Further, after being subjected to a reduction treatment at 800° C., the cerium-zirconium composite oxide has an oxygen storage amount of being more than 600 µmol $O_2$/g at 500° C.

Further, the rare earth element other than cerium is at least one selected from the group consisting of La, Pr, Nd, Y, Sm, Eu, Tb, and Yb; the transition metal element is at least one selected from the group consisting of Cu, Mn, and Ni; and the alkaline earth metal element is at least one selected from the group consisting of Mg, Ca, Sr, and Ba.

Further, the cerium oxide phase has a proportion 0.1~30 vol % in the cerium-zirconium composite oxide.

According to another aspect of the present disclosure, there is further provided a cerium-zirconium composite oxide, wherein the cerium-zirconium composite oxide consists of two or more cerium-zirconium solid solution phases with different crystal structures and different chemical compositions, wherein the chemical formula of the cerium-zirconium solid solution phase is $Ce_xZr_{1-x-y}M_yO_2$, where M is at least one selected from the group consisting of a rare earth element other than cerium, a transition metal element and an alkaline earth metal element, x is 15~85 mol %, and y is 0~20 mol %, and at least one of cerium-zirconium solid solution has a proportion of 0.1~99.9 vol % in the cerium-zirconium composite oxide.

Further, the cerium-zirconium composite oxide consists of two or more cerium-zirconium solid solution phases of a cubic crystal system, cell parameters of the cubic crystal system are in the range of 5.4103 Å≥a=b=c≥5.1283 Å, and there is a difference of 0.01~0.282 Å between the cell parameters of any two of the cubic crystal systems.

Further, the rare earth element other than cerium is at least one selected from the group consisting of La, Pr, Nd, Y, Sm, Eu, Tb, and Yb; the transition metal element is at least one selected from the group consisting of Cu, Mn, and Ni; and the alkaline earth metal element is at least one selected from the group consisting of Mg, Ca, Sr, and Ba.

According to another aspect of the present disclosure, there is further provided a preparation method for a cerium-zirconium composite oxide, wherein the preparation method comprises the steps of: Step S1: preparing a feed liquid A containing a tetravalent cerium ion, a zirconium ion and a doped metal ion at a composition ratio of the cerium-zirconium solid solution phase in the cerium-zirconium complex oxide provided by the present disclosure, preparing a trivalent cerium ion solution at a proportion of the cerium oxide phase in the cerium-zirconium composite oxide, and adding a complex to the trivalent cerium ion solution to obtain a feed liquid B, wherein the doped metal ion is the M in the cerium-zirconium complex oxide, and the complex contains a coordination ion of the cerium ion; Step S2: adding the feed liquid A, the feed liquid B and a precipitant simultaneously to a reactor to be mixed for reaction, and adjusting the pH to 7~13 to obtain a precipitated slurry; Step S3: aging the precipitated slurry; and Step S4: obtaining a precipitate after the precipitated slurry being aged is subjected to solid-liquid separation, and obtaining the cerium-zirconium composite oxide after the precipitate is subjected to post-treatment.

Further, the complex is at least one selected from the group consisting of an organic acid, an organic amine, and an aliphatic alcohol, and is preferably at least one selected from the group consisting of ethylenediaminetetraacetic acid, citric acid, acetic acid, salicylic acid, p-toluylic acid and stearyl alcohol.

Further, the complex has a used amount of 1~20%, preferably 3~10%, of the molar quantity of trivalent cerium ions in the trivalent cerium ion solution.

Further, the precipitant comprises at least one selected from the group consisting of magnesium carbonate solution, hydroxide of at least one element of ammonium, sodium and potassium, carbonate, and bicarbonate, preferably at least one selected from the group consisting of sodium hydroxide, ammonia and ammonium bicarbonate.

Further, in Step S2, a precipitation reaction temperature is 25~95° C. and a reaction time is 0.5~10 hrs.

Further, in Step S2, adjusting the pH to 8~10.

Further, in Step S3, an aging temperature is 50~300° C. and an aging time is 3 hrs or more.

Further, the post-treatment includes at least one step of the drying, roasting and grading steps; when the post-treatment includes roasting, the roasting temperature is 500~800° C., and the roasting time is 1~10 hrs.

According to another aspect of the present disclosure, there is further provided a preparation method for a cerium-zirconium composite oxide, wherein the preparation method includes the steps of: Step S1: preparing each cerium-zirconium solid solution feed liquid at a composition ratio of the cerium-zirconium solid solution phase in the cerium-zirconium complex oxide as described above, wherein each of the cerium-zirconium solid solution feed liquid comprises a tetravalent cerium ion, a zirconium ion and a doped metal ion, wherein the doped metal ion is the M in the cerium-zirconium complex oxide; Step S2: performing a precipitation reaction of each of the cerium-zirconium solid solution feed liquid with a precipitant one by one, and adjusting the pH to 7~13 to obtain a precipitated slurry; Step S3: aging the precipitated slurry; and Step S4: obtaining a precipitate after the precipitated slurry being aged is subjected to solid-liquid separation, and obtaining the cerium-zirconium composite oxide after the precipitate is subjected to post-treatment.

According to another aspect of the present disclosure, there is further provided application of a catalyst prepared from the cerium-zirconium composite oxide as described above, wherein the catalyst is applied to vehicle exhaust gas purification, natural gas catalytic combustion, organic waste gas purification treatment and industrial waste gas denitrification treatment.

According to the technical solution of the present disclosure, the cerium-zirconium composite oxide provided by the present disclosure includes a cerium oxide phase and a cerium-zirconium solid solution phase. Since the cerium oxide phase and the cerium-zirconium solid solution phase have different cell parameters, the cerium oxide phase and the cerium zirconium solid solution phase have a different phase boundary, thereby reducing the contact area of the sintered neck. The cerium-zirconium composite oxide has a high anti-sintering performance in the synergistic or coupled effect between the cerium oxide phase and the cerium-zirconium solid solution phase so that the high temperature stability of the cerium-zirconium composite oxide is improved.

For the cerium-zirconium composite oxide consisting of cerium-zirconium solid solution phases with different crystal structures and different chemical compositions, since the cerium-zirconium material with different chemical compositions has different physical and chemical properties and catalytic performance, and the cell parameters between the phases are different, there will be synergies therebetween when two phases or multiple phases coexist, so as to further improve the using performance of cerium-zirconium composite oxide.

In addition, since the present disclosure has needle-like cerium oxide and near-spherical cerium-zirconium solid solution in the composite phase cerium-zirconium composite oxide, two shapes of particles support each other and interact with each other so that the cerium-zirconium composite oxide of the present disclosure has a high specific surface, has a good pore structure with good temperature resistance, and improves the oxygen storage capacity of the cerium-zirconium composite oxide, so that the catalyst prepared by the cerium-zirconium composite oxide of the present disclosure has a good catalytic application performance and effect.

BRIEF DESCRIPTION OF THE DRAWINGS

The drawings forming a part of the present application are described here to provide further understanding of the present disclosure. The schematic embodiments and description of the present disclosure are adopted to explain the present disclosure, and do not form improper limits to the present disclosure. In the drawings.

DETAILED DESCRIPTION OF THE EMBODIMENTS

Figure 1:
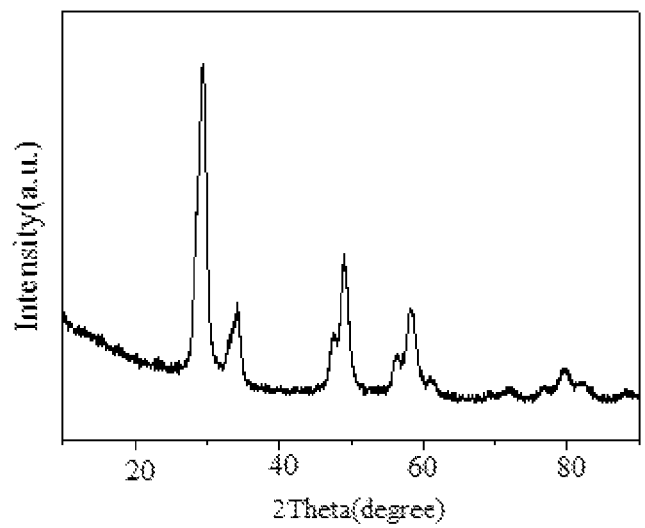
FIG. 1 shows an XRD pattern of a cerium-zirconium composite oxide provided in Embodiment 4 of the present disclosure.

It is to be noted that the embodiments in the present application and the characteristics in the embodiments may be combined with each other under the condition of no conflicts. The present disclosure is described below with reference to the drawings and the embodiments in detail.

It is to be noted that the terminology used herein is for the purpose of describing specific embodiments only and is not intended to be limiting the exemplary embodiments in accordance with the present application. As used herein, the singular forms are intended to include the plural forms unless the context clearly indicates otherwise. In addition, it is to be understood that when the terms "contain" and/or "include" are used in the specification, it indicates the presence of features, steps, operations, devices, components, and/or combinations thereof.

As is apparent from the background, the high-temperature stability of the cerium-zirconium composite oxide in the prior art is insufficient, thereby affecting the catalytic using performance of the cerium-zirconium composite oxide. The inventors of the present disclosure have studied the above problems by providing a cerium-zirconium composite oxide, wherein the cerium-zirconium composite oxide has a composite phase structure, and includes a cerium oxide phase and a cerium-zirconium solid solution phase, wherein the chemical formula of the cerium-zirconium solid solution phase is $Ce_xZr_{1-x-y}M_yO_2$, where M is at least one selected from the group consisting of a rare earth element other than cerium, a transition metal element and an alkaline earth metal element, x is 15~85 mol %, and y is 0~20 mol %.

The cerium-zirconium composite oxide provided by the present disclosure includes a cerium oxide phase and a cerium-zirconium solid solution phase. Since the cerium oxide phase and the cerium-zirconium solid solution phase have different cell parameters, the cerium oxide phase and the cerium zirconium solid solution phase have a different phase boundary, thereby reducing the contact area of the sintered neck. The cerium-zirconium composite oxide has a high anti-sintering performance in the synergistic or coupled effect between the cerium oxide phase and the cerium-zirconium solid solution phase so that the high temperature stability of the cerium-zirconium composite oxide is improved. In addition, since the present disclosure has needle-like cerium oxide and near-spherical cerium-zirconium solid solution in the composite phase cerium-zirconium composite oxide, two shapes of particles support each other and interact with each other so that the cerium-zirconium composite oxide of the present disclosure has a high specific surface, has a good pore structure with good temperature resistance, and improves the oxygen storage capacity of the cerium-zirconium composite oxide, so that the catalyst prepared by the cerium-zirconium composite oxide of the present disclosure has a good catalytic application performance and effect.

The rare earth element other than cerium is at least one selected from the group consisting of La, Pr, Nd, Y, Sm, Eu, Tb, and Yb; the transition metal element is at least one selected from the group consisting of Cu, Mn, and Ni; and the alkaline earth metal element is at least one selected from the group consisting of Mg, Ca, Sr, and Ba.

In order to further improve the high temperature stability of the cerium-zirconium composite oxide, the cerium oxide phase has a proportion 0.1~30 vol % in the cerium-zirconium composite oxide. Further preferably, after the cerium-zirconium composite oxide is subjected to heat preservation at 1000° C. for 4 hours, the cerium oxide phase has a proportion of 0.5~30 vol % in the cerium-zirconium composite oxide, preferably 3~20 vol %, wherein the proportion of the cerium oxide phase in the cerium-zirconium composite oxide may be obtained by XRD pattern analysis.

Preferably, the cerium-zirconium composite oxide comprises cerium oxide needle-like particles and cerium-zirconium solid solution near-spherical particles, and after being subjected to heat preservation at 1000° C. for 4 hours, the cerium oxide needle-like particles have a diameter of 7~20 nm and a length of 50~300 nm, the cerium-zirconium solid solution near-spherical particles have a diameter of 5~30 nm, and the cerium oxide needle-like particles have a volume ratio of 0.5~25% in the cerium-zirconium composite oxide. At this time, due to the presence of needle-like cerium oxide and near-spherical cerium-zirconium solid solution, two shapes of particles support each other and interact with each other so that the cerium-zirconium composite oxide of the present disclosure has a high specific surface, has a good pore structure with good temperature resistance, and improves the oxygen storage capacity of the cerium-zirconium composite oxide, so that the catalyst prepared by the cerium-zirconium composite oxide of the present disclosure has a good catalytic application performance and effect.

In order to further improve the stability of the cerium-zirconium composite oxide, in a preferred embodiment, after being subjected to heat preservation at 1000° C. for 4 hours, the cerium-zirconium composite oxide has a pore size of 5~45 nm, preferably 10~40 nm; and after being subjected to heat preservation at 1000° C. for 4 hours, the cerium-zirconium composite oxide has a specific surface area of being more than 50 $m^2$/g.

Preferably, after being subjected to a reduction treatment at 800° C., the above cerium-zirconium composite oxide has an oxygen storage amount of being more than 600 $\mu molO_2$/g at 500° C., wherein the cerium zirconium oxygen storage amount test uses the oxygen pulse titration test method of the Chembet PULSAR TPR/TPD chemical adsorption instrument from Quantachrome in the United States.

According to another aspect of the present disclosure, there is further provided a cerium-zirconium composite oxide, wherein the cerium-zirconium composite oxide consists of two or more cerium-zirconium solid solution phases with different crystal structures and different chemical compositions, wherein the chemical formula of the cerium-zirconium solid solution phase is $Ce_xZr_{1-x-y}M_yO_2$, but the chemical compositions of each cerium-zirconium solid solution phase are different, where M is at least one selected from the group consisting of a rare earth element other than cerium, a transition metal element and an alkaline earth metal element, x is 15~85 mol %, and y is 0~20 mol %, and at least one of cerium-zirconium solid solution has a proportion of 0.1~99.9 vol % in the cerium-zirconium composite oxide.

Further, the cerium-zirconium composite oxide consists of two or more cerium-zirconium solid solution phases of a cubic crystal system, cell parameters of the cubic crystal system are in the range of 5.4103 Å≥a=b=c≥5.1283 Å, and there is a difference of 0.01~0.282 Å between the cell parameters of any two of the cubic crystal systems.

Further, the rare earth element other than cerium is at least one selected from the group consisting of La, Pr, Nd, Y, Sm, Eu, Tb, and Yb; the transition metal element is at least one selected from the group consisting of Cu, Mn, and Ni; and the alkaline earth metal element is at least one selected from the group consisting of Mg, Ca, Sr, and Ba.

Since the cerium-zirconium material with different chemical compositions has different physical and chemical properties and catalytic performance, and the cell parameters between the phases are different, there will be synergies between multiple components and/or phases when the cerium-zirconium composite oxide consists of two or more cerium-zirconium solid solution phases, so as to improve the using performance of cerium-zirconium composite oxide.

According to another aspect of the present disclosure, there is further provided a preparation method for a cerium-zirconium composite oxide, wherein the preparation method includes the steps of: Step S1: preparing a feed liquid A containing a tetravalent cerium ion, a zirconium ion and a doped metal ion at a composition ratio of the cerium-zirconium solid solution phase in the cerium-zirconium complex oxide provided by the present disclosure, preparing a trivalent cerium ion solution at a proportion of the cerium oxide phase in the cerium-zirconium composite oxide, and adding a complex to the trivalent cerium ion solution to obtain a feed liquid B, wherein the doped metal ion is M in the cerium-zirconium complex oxide, and the complex contains a coordination ion of the cerium ion; Step S2: adding the feed liquid A, the feed liquid B and a precipitant simultaneously to a reactor to be mixed for reaction, and adjusting the pH to 7~13 to obtain a precipitated slurry; Step S3: aging the precipitated slurry; and Step S4: obtaining a precipitate after the precipitated slurry being aged is subjected to solid-liquid separation, and obtaining the cerium-zirconium composite oxide after the precipitate is subjected to post-treatment.

The cerium-zirconium composite oxide obtained by the above preparation method includes a cerium oxide phase and a cerium-zirconium solid solution phase. Since the cerium oxide phase and the cerium-zirconium solid solution phase have different cell parameters, the cerium oxide phase and the cerium zirconium solid solution phase have a different phase boundary. The cerium-zirconium composite oxide contains cerium oxide needle-like particles and cerium-zirconium solid solution near-spherical particles. Two shapes of particles form a support structure in the space, reducing the contact area of the sintered neck. The cerium-zirconium composite oxide has a high anti-sintering performance in the synergistic or coupled effect between the cerium oxide phase and the cerium-zirconium solid solution phase so that the high temperature stability of the cerium-zirconium composite oxide is improved. The cerium-zirconium composite oxide has a high specific surface and oxygen storage capacity so as to have an excellent catalytic application performance.

Exemplary embodiments of the preparation method of the cerium-zirconium composite oxide provided according to the present disclosure will be described in more detail below. However, these exemplary embodiments may be implemented in many different forms and should not be construed as being limited to the embodiments set forth herein. It is to be understood that these embodiments are provided so that the disclosure of this application is thorough and complete, and that the concepts of these exemplary embodiments will be fully conveyed to one of ordinary skill in the art.

First, Step S1 is carried out, that is, preparing a feed liquid A containing a tetravalent cerium ion, a zirconium ion and a doped metal ion at a composition ratio of the cerium-zirconium solid solution phase in the cerium-zirconium complex oxide provided by the present disclosure, preparing a trivalent cerium ion solution at a proportion of the cerium oxide phase in the cerium-zirconium composite oxide, and adding a complex to the trivalent cerium ion solution to obtain a feed liquid B, wherein the doped metal ion is M in the cerium-zirconium complex oxide, and the complex contains a coordination ion of the cerium ion.

The cerium used for preparing the A mixed solution is tetravalent cerium nitrate or cerium ammonium nitrate, the zirconium salt is zirconyl nitrate or zirconium oxychloride, and the other doped metal ions are nitrate or chloride. The cerium used for preparing the feed liquid B may be trivalent cerium nitrate, cerium chloride and other soluble trivalent cerium raw materials. The used complex includes at least one selected from the group consisting of an organic acid, an organic amine, and an aliphatic alcohol, and is preferably at least one selected from the group consisting of ethylenediaminetetraacetic acid, citric acid, acetic acid, salicylic acid, p-toluylic acid and stearyl alcohol. The complex has a used amount of 1~20%, preferably 3~10%, of the molar quantity of trivalent cerium ions.

In this step, the tetravalent cerium feedstock is used in the feed liquid A in order to cause cerium and zirconium to precipitate and crystallize at the same level during the reaction of the cerium-zirconium solid solution phase. Since the tetravalent cerium and the tetravalent zirconium have a similar solubility product constant, the pH values in the beginning of precipitating are similar, which is favorable for the solid solution of the cerium-zirconium solid solution phase. The addition of the complex to the feed liquid B is to change the coordination state of the cerium, which is favorable for the formation of the cerium oxide phase during the reaction with the precipitant, and the material self-assembly of the cerium oxide will occur in the presence of the complex. The growth pattern of the orientation adhesion is generated between particles in the process of aging. It is easy to form rod-like particles. The proportion of the cerium oxide phase and the cerium-zirconium solid solution phase in the cerium-zirconium composite oxide composite phase is controlled by controlling the proportion of the feed liquid A and the feed liquid B.

After completing Step S1, Step S2 is carried out by adding the feed liquid A, the feed liquid B and a precipitant simultaneously to a reactor to be mixed for reaction, and adjusting the pH to 7~13 so as to completely precipitate the metal ions to obtain a precipitated slurry. In this step, a precipitation reaction temperature is 25~95° C. and a reaction time is 0.5~10 hrs.

The above precipitant may contain at least one selected from the group consisting of magnesium carbonate solution, and hydroxide of at least one element of ammonium, sodium and potassium, carbonate, and bicarbonate, preferably at least one selected from the group consisting of sodium hydroxide, ammonia and ammonium bicarbonate.

After completing Step S2, Step S3 is carried out by aging the precipitated slurry. In the step of aging the precipitated slurry, it is preferable that an aging temperature is 50~300° C. and an aging time is more than 3 hrs.

Finally, Step S4 is performed by obtaining a precipitate after the precipitated slurry being aged is subjected to solid-liquid separation, and obtaining the cerium-zirconium composite oxide after the precipitate is subjected to post-treatment. Preferably, the post-treatment includes at least one step selected from the group consisting of drying, roasting and grading steps. The temperature and time of the roasting treatment may be set according to the actual demand. Preferably, a roasting temperature is 500~800° C. and a roasting time is 1~10 hrs.

According to another aspect of the present disclosure, there is further provided a method for the preparation of a cerium-zirconium composite oxide, wherein the preparation method includes the steps of: preparing each cerium-zirconium solid solution feed liquid at a composition ratio of the cerium-zirconium solid solution phase in any of the above cerium-zirconium complex oxide, wherein each of the cerium-zirconium solid solution feed liquid comprises a tetravalent cerium ion, a zirconium ion and a doped metal ion, wherein the doped metal ion is M in the cerium-zirconium complex oxide; Step S2: adding each of the cerium-zirconium solid solution feed liquid to a reactor together with a precipitant one by one simultaneously to be mixed for reaction, and adjusting the pH to 7~13 to obtain a precipitated slurry; Step S3: aging the precipitated slurry; and Step S4: obtaining a precipitate after the precipitated slurry being aged is subjected to solid-liquid separation, and obtaining the cerium-zirconium composite oxide after the precipitate is subjected to post-treatment.

The above cerium-zirconium composite oxide consists of cerium-zirconium solid solution phases with different chemical compositions. Since the cerium-zirconium material with different chemical compositions has different physical and chemical properties and catalytic performance, and the cell parameters between the phases are different, there will be synergies therebetween when two phases or multiple phases coexist, so as to further improve the using performance of cerium-zirconium composite oxide.

The cerium-zirconium composite oxide having a composite phase structure consisting of cerium-zirconium solid solution phases with two or more different chemical compositions has a preparation method similar to the preparation method of cerium-zirconium composite oxide having a composite phase consisting of a cerium oxide phase and a cerium-zirconium solid solution phase, so that the steps in the above method are also applicable to the preparation method. The only difference is that in the compounding process, the cerium used in the mixing feed liquid of the cerium-zirconium solid solution phase in any of the above cerium-zirconium composite oxide is tetravalent cerium nitrate or cerium ammonium nitrate, the zirconium salt is zirconyl nitrate or zirconium oxychloride, and the other doped metal ions are nitrate or chloride; in the precipitation stage, each of the cerium-zirconium solid solution feed liquid is added to a reactor together with the precipitant one by one simultaneously to be mixed for reaction.

The present disclosure further provides application of a catalyst prepared from the cerium-zirconium composite oxide as described above, wherein the catalyst is applied to vehicle exhaust gas purification, natural gas catalytic combustion, organic waste gas purification treatment and industrial waste gas denitrification treatment.

Since the cerium oxide phase and the cerium-zirconium solid solution phase have different cell parameters, the cerium oxide phase and the cerium zirconium solid solution phase have a different phase boundary. The cerium-zirconium composite oxide contains cerium oxide needle-like particles and cerium-zirconium solid solution near-spherical particles. Two shapes of particles form a support structure in the space, reducing the contact area of the sintered neck. The cerium-zirconium composite oxide has a high anti-sintering performance in the synergistic or coupled effect between the cerium oxide phase and the cerium-zirconium solid solution phase so that the high temperature stability of the cerium-zirconium composite oxide is improved. In addition, since the present disclosure has needle-like cerium oxide and near-spherical cerium-zirconium solid solution in the composite phase cerium-zirconium composite oxide, two shapes of particles support each other and interact with each other so that the cerium-zirconium composite oxide of the present disclosure has a high specific surface, has a good pore structure with good temperature resistance, and improves the oxygen storage capacity of the cerium-zirconium composite oxide, so that the catalyst prepared by the cerium-zirconium composite oxide of the disclosure has a good catalytic application performance and effect.

The above cerium-zirconium composite oxide consists of cerium-zirconium solid solution phases with different chemical compositions. Since the cerium-zirconium material with different chemical compositions has different physical and chemical properties and catalytic performance, there will be synergies therebetween when two phases or multiple phases coexist, so as to further improve the using performance of cerium-zirconium composite oxide.

The cerium-zirconium composite oxide and the preparation method of the cerium-zirconium composite oxide provided by the present disclosure will be further described with reference to the following embodiments.

Embodiment 1

The preparation method of the cerium-zirconium composite oxide provided by the present embodiment includes the following steps.

First, compounding is carried out at a molar ratio of Ce/Zr/Nd of 35:61:4 to obtain a cerium-zirconium solid solution phases mixed solution A (with a volume of 3 L) of tetravalent cerium nitrate, neodymium nitrate and zirconyl nitrate at a concentration of 1.5 M; a trivalent cerium nitrate solution having a concentration of 1.5 M is prepared as a feed liquid of cerium oxide phase, and ethylenediaminetetraacetic acid in an amount of 10% of the molar quantity of trivalent cerium ions is added to obtain a feed liquid B (160 ml in volume); subsequently, the feed liquid A, the feed liquid B and the precipitant ammonia are mixed for precipitation reaction in a manner of forward-feed, the pH value of the reaction system is adjusted to 10, the reaction time is 3 hours, and the reaction temperature is 60° C. to obtain the cerium-zirconium composite hydroxide precipitated slurry, the precipitated slurry is subjected to filtration, washing and drying to obtain a precipitate after being aged in the condition of water bath at 50° C. for 20 hours; and finally, the precipitate is roasted at 600° C. for 3 hours to obtain a cerium-zirconium composite oxide.

After the obtained cerium-zirconium composite oxide is subjected to heat preservation at 1000° C. for 4 hours, the proportion of the cerium oxide phase is 5 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 8~10 nm and a length of 120~150 nm, the near-spherical particles have a diameter of 7~11 nm; and the needle-like particles have a volume ratio of 4 vol %. The average pore size is 20.6 nm; at the same time, after being subjected to a reduction treatment at 800° C., the cerium-zirconium composite oxide has an oxygen storage amount of being 656 µmol $O_2$/g at 500° C.

The cerium-zirconium solid solution phase is $Ce_{0.35}Zr_{0.61}Nd_{0.04}O_2$, and the specific surface area of the cerium-zirconium composite oxide is 116.96 m$^2$/g. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (56.64 m$^2$/g). When prepared according to the prior art, a single phase cerium-zirconium composite oxide (with a component of $Ce_{0.35}Zr_{0.61}Nd_{0.04}O_2$) obtained by performing solid-liquid separation and roasting process on the precipitated slurry by a precipitation reaction has a specific surface area of only 47.98 m$^2$/g and an oxygen storage amount of being 525 µmol$O_2$/g after being aged at 1000° C. for 4 hours, which has a shape of a single sphere.

Embodiment 2

First, compounding is carried out at a molar ratio of Ce/Zr/La of 35:60:5 to obtain a cerium-zirconium solid solution phases mixed solution A (with a volume of 3 L) of ammonium cerium nitrate, lanthanum nitrate and zirconyl nitrate at a concentration of 1.5 M; a cerium chloride solution having a concentration of 1.5 M is prepared as a feed liquid of cerium oxide phase, and citric acid in an amount of 3% of the molar quantity of trivalent cerium ions is added to obtain a feed liquid B (100 ml in volume); subsequently, the feed liquid A, the feed liquid B and the precipitant sodium hydroxide are mixed for precipitation reaction in a manner of forward-feed, the pH value of the reaction system is adjusted to 9, the reaction time is 3 hours, and the reaction temperature is 60° C. to obtain the cerium-zirconium composite hydroxide precipitated slurry, the precipitated slurry is charged into a high pressure reactor and subjected to hydrothermal aging at 200° C. for 3 hours to obtain a cerium-zirconium composite hydroxide precipitated slurry, the precipitated slurry is subjected to filtration, washing and drying to obtain a precipitate; and finally, the precipitate is roasted at 500° C. for 10 hours to obtain a cerium-zirconium composite oxide.

After the obtained cerium-zirconium composite oxide is subjected to heat preservation at 1000° C. for 4 hours, the proportion of the cerium oxide phase is 3 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 9~13 nm and a length of 140~180 nm, the near-spherical particles have a diameter of 10~14 nm; and the needle-like particles have a volume ratio of 2 vol %. The average pore size is 29.7 nm; at the same time, after being subjected to a reduction treatment at 800° C., the cerium-zirconium composite oxide has an oxygen storage amount of being 675 µmol $O_2$/g at 500° C.

The cerium-zirconium solid solution phase is $Ce_{0.35}Zr_{0.60}La_{0.05}O_2$, and the specific surface area of the cerium-zirconium composite oxide is 120 m$^2$/g. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (57.48 m$^2$/g). When prepared according to the prior art, a cerium-zirconium composite oxide (with a component of $Ce_{0.35}Zr_{0.60}La_{0.05}O_2$) has a specific surface area of only 46.98 m$^2$/g and an oxygen storage amount of being 540 µmol$O_2$/g after being aged at 1000° C. for 4 hours, which has a shape of a single sphere.

Embodiment 3

First, compounding is carried out at a molar ratio of Ce/Zr/La/Pr of 34:58:4:4 to obtain a cerium-zirconium solid solution phases mixed solution A (with a volume of 2 L) of ammonium cerium nitrate, lanthanum nitrate, praseodymium nitrate and zirconyl nitrate at a concentration of 1 M; a cerium chloride solution having a concentration of 1 M is prepared as a feed liquid of cerium oxide phase, and ethylenediaminetetraacetic acid in an amount of 14% of the molar quantity of trivalent cerium ions is added to obtain a feed liquid B (130 ml in volume); subsequently, the feed liquid A, the feed liquid B and the precipitant potassium hydroxide are mixed for precipitation reaction in a manner of forward-feed, the pH value of the reaction system is adjusted to 12, the reaction time is 2 hours, and the reaction temperature is 95° C. to obtain the cerium-zirconium composite hydroxide precipitated slurry, the precipitated slurry is charged into a high pressure reactor and subjected to hydrothermal aging at 300° C. for 12 hours to obtain a cerium-zirconium composite hydroxide precipitated slurry, the precipitated slurry is subjected to filtration, washing and drying to obtain a precipitate; and finally, the precipitate is roasted at 600° C. for 3 hours to obtain a cerium-zirconium composite oxide.

After the obtained cerium-zirconium composite oxide is subjected to heat preservation at 1000° C. for 4 hours, the proportion of the cerium oxide phase is 6 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 8~12 nm and a length of 130~160 nm, the near-spherical particles have a diameter of 8~12 nm; and the needle-like particles have a volume ratio of 5 vol %. The average pore size is 18.4 nm; at the same time, after being subjected to a reduction treatment at 800° C., the cerium-zirconium composite oxide has an oxygen storage amount of being 660 µmol$O_2$/g at 500° C.

The cerium-zirconium solid solution phase is $Ce_{0.34}Zr_{0.58}La_{0.04}Pr_{0.044}O_2$, and the specific surface area of the cerium-zirconium composite oxide is 132 m$^2$/g. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (60.36 m$^2$/g). When prepared according to the prior art, a cerium-zirconium composite oxide (with a component of $Ce_{0.34}Zr_{0.58}La_{0.04}Pr_{0.044}O_2$) has a specific surface area of only 48.84 m²/g and an oxygen storage amount of being 530 μmolO₂/g after being aged at 1000° C. for 4 hours, which has a shape of a single sphere.

Embodiment 4

First, compounding is carried out at a molar ratio of Ce/Zr/La/Pr of 34:56:5.5:4.5 to obtain a cerium-zirconium solid solution phases mixed solution A (with a volume of 2 L) of ammonium cerium nitrate, lanthanum nitrate, praseodymium nitrate and zirconyl nitrate at a concentration of 1.5 M; a cerium chloride solution having a concentration of 1.5 M is prepared as a feed liquid of cerium oxide phase, and salicylic acid in an amount of 20% of the molar quantity of trivalent cerium ions is added to obtain a feed liquid B (250 ml in volume); subsequently, the feed liquid A, the feed liquid B and the precipitant sodium hydroxide of 3M are mixed for precipitation reaction, the pH value of the reaction system is adjusted to 10, the reaction time is 0.5 hours, and the reaction temperature is 80° C. to obtain the cerium-zirconium composite hydroxide precipitated slurry, the precipitated slurry is charged into a high pressure reactor and subjected to hydrothermal aging at 200° C. for 36 hours to obtain a cerium-zirconium composite hydroxide precipitated slurry, the precipitated slurry is subjected to filtration, washing and drying to obtain a precipitate; and finally, the precipitate is roasted at 800° C. for 1 hour after being subjected to heat preservation at 300° C. for 10 hours to obtain a cerium-zirconium composite oxide.

After the obtained cerium-zirconium composite oxide is subjected to heat preservation at 1000° C. for 4 hours, the proportion of the cerium oxide phase is 6 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 10~14 nm and a length of 150~200 nm, the near-spherical particles have a diameter of 12~16 nm; and the needle-like particles have a volume ratio of 10 vol %. The average pore size is 15.6 nm; at the same time, after being subjected to a reduction treatment at 800° C., the cerium-zirconium composite oxide has an oxygen storage amount of being 680 μmolO₂/g at 500° C.

The cerium-zirconium solid solution phase is $Ce_{0.34}Zr_{0.56}La_{0.055}Pr_{0.045}O_2$, and the specific surface area of the cerium-zirconium composite oxide is 132 m²/g. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (62.64 m²/g). When prepared according to the prior art, a cerium-zirconium composite oxide (with a component of $Ce_{0.34}Zr_{0.56}La_{0.055}Pr_{0.045}O_2$) has a specific surface area of only 50.91 m²/g and an oxygen storage amount of being 545 μmolO₂/g after being aged at 1000° C. for 4 hours, which has a shape of a single sphere.

Embodiment 5

First, compounding is carried out at a molar ratio of Ce/Zr/La/Pr/Y of 34:52:4:5:4 to obtain a cerium-zirconium solid solution phases mixed solution A (with a volume of 2 L) of ammonium cerium nitrate, lanthanum nitrate, praseodymium nitrate, yttrium nitrate and zirconyl nitrate at a concentration of 1 M; a cerium chloride solution having a concentration of 1 M is prepared as a feed liquid of cerium oxide phase, and p-toluylic acid in an amount of 10% of the molar quantity of trivalent cerium ions is added to obtain a feed liquid B (220 ml in volume); subsequently, the feed liquid A, the feed liquid B and the precipitant magnesium bicarbonate solution of 8 g/L (MgO) are mixed for precipitation reaction in a manner of forward-feed, the pH value of the reaction system is adjusted to 7, the reaction time is 5 hours, and the reaction temperature is 25° C. to obtain the cerium-zirconium precursor precipitated slurry which is placed and aged at the room temperature of 25° C. for 36 hours, the precipitated slurry is subjected to filtration, washing and drying to obtain a precipitate; and finally, the precipitate is roasted at 650° C. for 3 hours to obtain a cerium-zirconium composite oxide.

The XRD pattern of the obtained composite oxide sample is analyzed and the proportion of cerium oxide phase is 9 vol %; after the obtained cerium-zirconium composite oxide is subjected to heat preservation at 1000° C. for 4 hours, the proportion of the cerium oxide phase is 10 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 15~20 nm and a length of 220~300 nm, the near-spherical particles have a diameter of 22~30 nm; and the needle-like particles have a volume ratio of 8 vol %. The average pore size is 44.2 nm; at the same time, after being subjected to a reduction treatment at 800° C., the cerium-zirconium composite oxide has an oxygen storage amount of being 705 μmolO₂/g at 500° C.

The cerium-zirconium solid solution phase is $Ce_{0.34}Zr_{0.52}La_{0.04}Pr_{0.05}Y_{0.04}O_2$, and the specific surface area of the cerium-zirconium composite oxide is 128 m²/g. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (58.29 m²/g).

Embodiment 6

First, compounding is carried out at a molar ratio of Ce/Zr/La/Mn of 60:30:7:3 to obtain a cerium-zirconium solid solution phases mixed solution A (with a volume of 3 L) of tetravalent cerium nitrate, lanthanum nitrate, manganese nitrate and zirconyl nitrate at a concentration of 1 M; a trivalent cerium nitrate solution having a concentration of 1 M is prepared as a feed liquid of cerium oxide phase, and stearyl alcohol in an amount of 8% of the molar quantity of trivalent cerium ions is added to obtain a feed liquid B (750 ml in volume); subsequently, the feed liquid A, the feed liquid B and the precipitant ammonia solution are mixed for precipitation reaction in a manner of forward-feed, the pH value of the reaction system is adjusted to 9, the reaction time is 2 hours, and the reaction temperature is 80° C. to obtain the cerium-zirconium precursor precipitated slurry which is aged at 80° C. for 48 hours, the precipitated slurry is subjected to filtration, washing and drying to obtain a precipitate; and finally, the precipitate is roasted at 700° C. for 3 hours to obtain a cerium-zirconium composite oxide.

After the obtained cerium-zirconium composite oxide is subjected to heat preservation at 1000° C. for 4 hours, the proportion of the cerium oxide phase is 20 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 10~15 nm and a length of 40~220 nm, the near-spherical particles have a diameter of 12~16 nm; and the needle-like particles have a volume ratio of 16 vol %. The average pore size is 34.8 nm; at the same time, after being subjected to a reduction treatment at 800° C., the cerium-zirconium composite oxide has an oxygen storage amount of being 880 µmolO$_2$/g at 500° C.

The cerium-zirconium solid solution phase is Ce$_{0.60}$Zr$_{0.30}$La$_{0.7}$Mn$_{0.03}$O$_2$, and the specific surface area of the cerium-zirconium composite oxide is 119 m$^2$/g. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (57.64 m$^2$/g).

Embodiment 7

First, compounding is carried out at a molar ratio of Ce/Zr/La/Pr/Y of 58:31:4:2:5 to obtain a cerium-zirconium solid solution phases mixed solution A (with a volume of 10 L) of ammonium cerium nitrate, lanthanum nitrate, praseodymium nitrate, yttrium nitrate and zirconyl nitrate at a concentration of 1 M; a trivalent cerium nitrate solution having a concentration of 1 M is prepared as a feed liquid of cerium oxide phase, and citric acid in an amount of 7% of the molar quantity of trivalent cerium ions is added to obtain a feed liquid B (1765 ml in volume); subsequently, the feed liquid A, the feed liquid B and the mixed precipitant ammonia at a mass fraction of 15% and ammonium bicarbonate (at a molar ratio of 1:1) are mixed for precipitation reaction in a manner of forward-feed, the pH value of the reaction system is adjusted to 9, the reaction time is 10 hours, and the reaction temperature is 80° C. to obtain the cerium-zirconium precursor precipitated slurry which is aged at 80° C. for 36 hours, the precipitated slurry is subjected to filtration, washing and drying to obtain a precipitate; and finally, the precipitate is roasted at 600° C. for 3 hours to obtain a cerium-zirconium composite oxide.

After the obtained cerium-zirconium composite oxide is subjected to heat preservation at 1000° C. for 4 hours, the proportion of the cerium oxide phase is 15 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 8~12 nm and a length of 130~160 nm, the near-spherical particles have a diameter of 10~16 nm; and the needle-like particles have a volume ratio of 11 vol %. The average pore size is 25.5 nm; at the same time, after being subjected to a reduction treatment at 800° C., the cerium-zirconium composite oxide has an oxygen storage amount of being 840 µmolO$_2$/g at 500° C.

The cerium-zirconium solid solution phase is Ce$_{0.58}$Zr$_{0.31}$La$_{0.4}$Pr$_{0.02}$Y$_{0.06}$O$_2$, and the specific surface area of the cerium-zirconium composite oxide is 126 m$^2$/g. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (65.58 m$^2$/g).

Embodiment 8

First, compounding is carried out at a molar ratio of Ce/Zr/La/Sr of 55:38:5:2 to obtain a cerium-zirconium solid solution phases mixed solution A (with a volume of 2 L) of ammonium cerium nitrate, lanthanum nitrate, strontium nitrate and zirconyl nitrate at a concentration of 1.5 M; a cerium chloride solution having a concentration of 1.5 M is prepared as a feed liquid of cerium oxide phase, and salicylic acid in an amount of 13% of the molar quantity of trivalent cerium ions is added to obtain a feed liquid B (300 ml in volume); subsequently, the feed liquid A, the feed liquid B and the sodium hydroxide precipitant of 2.5 M are mixed for precipitation reaction in a manner of forward-feed, the pH value of the reaction system is adjusted to 10, the reaction time is 3 hours, and the reaction temperature is 50° C. to obtain the cerium-zirconium precursor precipitated slurry which is aged at 50° C. for 72 hours, the precipitated slurry is subjected to filtration, washing and drying to obtain a precipitate; and finally, the precipitate is roasted at 600° C. for 3 hours to obtain a cerium-zirconium composite oxide.

After the obtained cerium-zirconium composite oxide is subjected to heat preservation at 1000° C. for 4 hours, the proportion of the cerium oxide phase is 13 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 7~10 nm and a length of 80~130 nm, the near-spherical particles have a diameter of 6~13 nm; and the needle-like particles have a volume ratio of 9 vol %. The average pore size is 10.4 nm; at the same time, after being subjected to a reduction treatment at 800° C., the cerium-zirconium composite oxide has an oxygen storage amount of being 810 µmolO$_2$/g at 500° C.

The cerium-zirconium solid solution phase is Ce$_{0.55}$Zr$_{0.38}$La$_{0.05}$Sr$_{0.02}$O$_2$, and the specific surface area of the cerium-zirconium composite oxide is 132 m$^2$/g. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (59.23 m$^2$/g).

Embodiment 9

First, compounding is carried out at a molar ratio of Ce/Zr/La/Tb/Cu of 34:58:4:1:3 to obtain a cerium-zirconium solid solution phases mixed solution A (with a volume of 2 L) of ammonium cerium nitrate, lanthanum nitrate, terbium nitrate, copper nitrate and zirconyl nitrate at a concentration of 1 M; a cerium nitrate solution having a concentration of 1 M is prepared as a feed liquid of cerium oxide phase, and stearyl alcohol in an amount of 8% of the molar quantity of trivalent cerium ions is added to obtain a feed liquid B (860 ml in volume); subsequently, the feed liquid A, the feed liquid B and the precipitant ammonia are mixed for precipitation reaction in a manner of forward-feed, the pH value of the reaction system is adjusted to 13, the reaction time is 3 hours, and the reaction temperature is 80° C. to obtain the cerium-zirconium precursor precipitated slurry which is aged at 80° C. for 40 hours, the precipitated slurry is subjected to filtration, washing and drying to obtain a precipitate; and finally, the precipitate is roasted at 500° C. for 6 hours to obtain a cerium-zirconium composite oxide.

The XRD pattern of the obtained composite oxide sample is analyzed and the proportion of cerium oxide is 30 vol %; after the obtained cerium-zirconium composite oxide is subjected to heat preservation at 1000° C. for 4 hours, the proportion of the cerium oxide phase is 30 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 7~11 nm and a length of 70~120 nm, the near-spherical particles have a diameter of 7~12 nm; and the needle-like particles have a volume ratio of 25 vol %. The average pore size is 7.8 nm; at the same time, after being subjected to a reduction treatment at 800° C., the cerium-zirconium composite oxide has an oxygen storage amount of being 750 $\mu mol O_2/g$ at 500° C.

The cerium-zirconium solid solution phase is $Ce_{0.34}Zr_{0.58}La_{0.04}Tb_{0.01}Cu_{0.03}O_2$, and the specific surface area of the cerium-zirconium composite oxide is 122 $m^2/g$. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (63.62 $m^2/g$).

Embodiment 10

First, compounding is carried out at a molar ratio of Ce/Zr/La/Pr/Ca of 34:46:10:7:3 to obtain a cerium-zirconium solid solution phases mixed solution A (with a volume of 10 L) of ammonium cerium nitrate, lanthanum nitrate, praseodymium nitrate, calcium nitrate and zirconyl nitrate at a concentration of 1 M; a cerium oxide solution having a concentration of 1 M is prepared as a feed liquid of cerium oxide phase, and acetic acid in an amount of 1% of the molar quantity of trivalent cerium ions is added to obtain a feed liquid B (50 ml in volume); subsequently, the feed liquid A, the feed liquid B and the sodium hydroxide precipitant of 6M are mixed for precipitation reaction in a manner of forward-feed, the pH value of the reaction system is adjusted to 13, the reaction time is 4 hours, and the reaction temperature is 25° C. to obtain the cerium-zirconium precursor precipitated slurry which is aged at 80° C. for 48 hours, the precipitated slurry is subjected to filtration, washing and drying to obtain a precipitate; and finally, the precipitate is roasted at 750° C. for 2 hours to obtain a cerium-zirconium composite oxide.

The XRD pattern of the obtained composite oxide sample is analyzed, finding that the proportion of cerium oxide is very low, which is close to the detection lower limit, of 0.1%. After the obtained cerium-zirconium composite oxide is subjected to heat preservation at 1000° C. for 4 hours, the proportion of the cerium oxide phase is 0.5 vol % by the analysis of the XRD pattern, after being subjected to heat preservation at 1000° C. for 4 hours, the needle-like particles have a very small proportion, which is about 1%, the near-spherical particles have a diameter of 5~10 nm. The average pore size is 5.0 nm; at the same time, after being subjected to a reduction treatment at 800° C., the cerium-zirconium composite oxide has an oxygen storage amount of being 640 $\mu mol O_2/g$ at 500° C.

The cerium-zirconium solid solution phase is $Ce_{0.34}Zr_{0.46}La_{0.10}Pr_{0.07}Ca_{0.03}O_2$, and the specific surface area of the cerium-zirconium composite oxide is 105 $m^2/g$. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (53.74 $m^2/g$). When prepared according to the prior art, a cerium-zirconium composite oxide (with a component of $Ce_{0.34}Zr_{0.46}La_{0.10}Pr_{0.07}Ca_{0.03}O_2$) has a specific surface area of only 45.67 $m^2/g$ after being aged at 1000° C. for 4 hours. In the present embodiment, the content of the composite phase is not so high, so that the increase in the specific surface area of the material aging is not great, and the oxygen storage amount is 550 $\mu mol O_2/g$.

Embodiment 11

First, compounding is carried out at a molar ratio of Ce/Zr/La/Eu/Ni of 15:69:8:4:4 to obtain a cerium-zirconium solid solution phases mixed solution A (with a volume of 3 L) of ammonium cerium nitrate, lanthanum nitrate, europium nitrate, nickel nitrate and zirconyl nitrate at a concentration of 1 M; a cerium oxide solution having a concentration of 1 M is prepared as a feed liquid of cerium oxide phase, and p-toluylic acid in an amount of 8% of the molar quantity of trivalent cerium ions is added to obtain a feed liquid B (125 ml in volume); subsequently, the feed liquid A, the feed liquid B and the sodium hydroxide precipitant of 6M are mixed for precipitation reaction in a manner of forward-feed, the pH value of the reaction system is adjusted to 11, the reaction time is 6 hours, and the reaction temperature is 80° C. to obtain the cerium-zirconium precursor precipitated slurry which is aged at 150° C. for 30 hours in a high pressure reactor, the precipitated slurry is subjected to filtration, washing and drying to obtain a precipitate; and finally, the precipitate is roasted at 600° C. for 3 hours to obtain a cerium-zirconium composite oxide.

After the obtained cerium-zirconium composite oxide is subjected to heat preservation at 1000° C. for 4 hours, the proportion of the cerium oxide phase is 4 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 9~14 nm and a length of 50~100 nm, the near-spherical particles have a diameter of 8~13 nm; and the needle-like particles have a volume ratio of 3 vol %. The average pore size is 14.8 nm; at the same time, after being subjected to a reduction treatment at 800° C., the cerium-zirconium composite oxide has an oxygen storage amount of being 650 $\mu mol\ O_2/g$ at 500° C.

The cerium-zirconium solid solution phase is $Ce_{0.15}Zr_{0.69}La_{0.8}Eu_{0.04}Ni_{0.04}O_2$, and the specific surface area of the cerium-zirconium composite oxide is 109 $m^2/g$. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (56.97 $m^2/g$). When prepared according to the prior art, a single phase cerium-zirconium composite oxide (with a component of $Ce_{0.15}Zr_{0.69}La_{0.08}Eu_{0.04}Ni_{0.04}O_2$) obtained by performing solid-liquid separation and roasting process on the precipitated slurry by a precipitation reaction has a specific surface area of only 47.24 $m^2/g$ and an oxygen storage amount of being 490 $\mu mol O_2/g$ after being aged at 1000° C. for 4 hours, which has a shape of a single sphere.

Embodiment 12

First, compounding is carried out at a molar ratio of Ce/Zr/La of 85:11:4 to obtain a mixed solution A (with a volume of 3 L) of ammonium cerium nitrate, lanthanum nitrate and zirconyl nitrate at a concentration of 1 M; a cerium chloride solution having a concentration of 1 M is prepared as a feed liquid of cerium oxide phase, and ethylenediaminetetraacetic acid in an amount of 7% of the molar quantity of trivalent cerium ions is added to obtain a feed liquid B (230 ml in volume); subsequently, the feed liquid A, the feed liquid B and the precipitant sodium hydroxide of 6 M are mixed for precipitation reaction in a manner of forward-feed, the pH value of the reaction system is adjusted to 10, the reaction time is 6 hours, and the reaction temperature is 80° C. to obtain the cerium-zirconium precursor precipitated slurry which is aged at 150° C. for 30 hours in a high pressure reactor, the precipitated slurry is subjected to filtration, washing and drying to obtain a precipitate; and finally, the precipitate is roasted at 600° C. for 3 hours to obtain a cerium-zirconium composite oxide.

After the obtained cerium-zirconium composite oxide is subjected to heat preservation at 1000° C. for 4 hours, the proportion of the cerium oxide phase is 7 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 10~15 nm and a length of 160~230 nm, the near-spherical particles have a diameter of 10~15 nm; and the needle-like particles have a volume ratio of 5 vol %. The average pore size is 22.4 nm; at the same time, after being subjected to a reduction treatment at 800° C., the cerium-zirconium composite oxide has an oxygen storage amount of being 945 $\mu molO_2/g$ at 500° C.

The cerium-zirconium solid solution phase is $Ce_{0.85}Zr_{0.11}La_{0.04}O_2$, and the specific surface area of the cerium-zirconium composite oxide is 127 $m^2/g$. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (68.36 $m^2/g$).

Embodiment 13

First, compounding is carried out at a molar ratio of Ce/Zr/La/Pr of 34:56:5.5:4.5 to obtain a cerium-zirconium solid solution phases mixed solution A (with a volume of 2 L) of ammonium cerium nitrate, lanthanum nitrate, praseodymium nitrate and zirconyl nitrate at a concentration of 1.5 M; a cerium chloride solution having a concentration of 1.5 M is prepared as a feed liquid of cerium oxide phase, and salicylic acid in an amount of 20% of the molar quantity of trivalent cerium ions is added to obtain a feed liquid B (500 ml in volume); subsequently, the feed liquid A, the feed liquid B and the precipitant sodium hydroxide of 3M are mixed for precipitation reaction, the pH value of the reaction system is adjusted to 10, the reaction time is 0.5 hours, and the reaction temperature is 80° C. to obtain the cerium-zirconium composite hydroxide precipitated slurry, the precipitated slurry is charged into a high pressure reactor and subjected to hydrothermal aging at 200° C. for 36 hours to obtain a cerium-zirconium composite hydroxide precipitated slurry, the precipitated slurry is subjected to filtration, washing and drying to obtain a precipitate; and finally, the precipitate is roasted at 800° C. for 1 hour after being subjected to heat preservation at 300° C. for 10 h to obtain a cerium-zirconium composite oxide.

After the obtained cerium-zirconium composite oxide is subjected to heat preservation at 1000° C. for 4 hours, the proportion of the cerium oxide phase is 22 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 10~14 nm and a length of 150~200 nm, the near-spherical particles have a diameter of 12~16 nm; and the needle-like particles have a volume ratio of 20 vol %. The average pore size is 16.4 nm; at the same time, after being subjected to a reduction treatment at 800° C., the cerium-zirconium composite oxide has an oxygen storage amount of being 720 $\mu molO_2/g$ at 500° C.

The cerium-zirconium solid solution phase is $Ce_{0.34}Zr_{0.56}La_{0.055}Pr_{0.045}O_2$, and the specific surface area of the cerium-zirconium composite oxide is 156 $m^2/g$. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (64.59 $m^2/g$).

Embodiment 14

First, compounding is carried out at a molar ratio of Ce/Zr/La/Pr of 34:56:5.5:4.5 to obtain a cerium-zirconium solid solution phases mixed solution A (with a volume of 2 L) of ammonium cerium nitrate, lanthanum nitrate, praseodymium nitrate and zirconyl nitrate at a concentration of 1.5 M; a cerium chloride solution having a concentration of 1.5 M is prepared as a feed liquid of cerium oxide phase, and salicylic acid in an amount of 10% and ethylenediaminetetraacetic acid in an amount of 10% are added to obtain a feed liquid B (640 ml in volume); subsequently, the feed liquid A, the feed liquid B and the precipitant sodium hydroxide of 3M are mixed for precipitation reaction, the pH value of the reaction system is adjusted to 10, the reaction time is 0.5 hours, and the reaction temperature is 80° C. to obtain the cerium-zirconium composite hydroxide precipitated slurry, the precipitated slurry is charged into a high pressure reactor and subjected to hydrothermal aging at 200° C. for 36 hours to obtain a cerium-zirconium composite hydroxide precipitated slurry, the precipitated slurry is subjected to filtration, washing and drying to obtain a precipitate; and finally, the precipitate is roasted at 800° C. for 1 hour after being subjected to heat preservation at 300° C. for 10 h to obtain a cerium-zirconium composite oxide.

After the obtained cerium-zirconium composite oxide is subjected to heat preservation at 1000° C. for 4 hours, the proportion of the cerium oxide phase is 28 vol % by the analysis of the XRD pattern, and the cerium-zirconium composite oxide contains cerium oxide needle-like particles and cerium-zirconium solid solution near-spherical particles, and after being subjected to heat preservation at 1000° C. for 4 hours, the needle-like particles have a diameter of 10~14 nm and a length of 150~200 nm, the near-spherical particles have a diameter of 12~16 nm; and the needle-like particles have a volume ratio of 25 vol %. The average pore size is 15.2 nm; at the same time, after being subjected to a reduction treatment at 800° C., the cerium-zirconium composite oxide has an oxygen storage amount of being 750 $\mu molO_2/g$ at 500° C.

The cerium-zirconium solid solution phase is $Ce_{0.34}Zr_{0.56}La_{0.055}Pr_{0.045}O_2$, and the specific surface area of the cerium-zirconium composite oxide is 158 $m^2/g$. At the same time, the specific surface area of the cerium-zirconium composite oxide is tested after aging the obtained cerium-zirconium composite oxide at 1000° C. for 4 hours. The result shows that the specific surface area of the composite oxide is kept at a high level (66.25 m²/g).

Embodiment 15

First, compounding is carried out at a molar ratio of Ce/Zr/La/Pr of 35:55:5.5:4.5 to obtain a first cerium-zirconium solid solution phase mixed solution C (with a volume of 2 L) of ammonium cerium nitrate, lanthanum nitrate, praseodymium nitrate and zirconyl nitrate at a concentration of 1.5 M; compounding is carried out at a molar ratio of Ce/Zr/La/Nd/Y of 17:73:2:4:4 to obtain a second cerium-zirconium solid solution phase mixed solution D (with a volume of 2 L) of ammonium cerium nitrate, lanthanum nitrate, neodymium nitrate, yttrium nitrate and zirconyl nitrate at a concentration of 1.5 M.

Subsequently, the mixed solution C and mixed solution D are mixed with the sodium hydroxide solution of 3M one by one for precipitation reaction, the pH value of the reaction system is adjusted to about 10, the reaction time is 4 hours, and the reaction temperature is 80° C. to obtain the cerium-zirconium composite hydroxide precipitated slurry, the precipitated slurry is charged into a high pressure reactor and subjected to hydrothermal aging at 200° C. for 36 hours to obtain a cerium-zirconium composite hydroxide precipitated slurry, the precipitated slurry is subjected to filtration, washing and drying to obtain a precipitate; and Finally, the precipitate is subjected to heat preservation at 600° C. for 5 hours to obtain a cerium-zirconium composite oxide.

The XRD detection and data fitting analysis show that the cerium-zirconium composite oxide contains cerium-zirconium solid solution phase with two chemical compositions, and its chemical compositions are $Ce_{0.35}Zr_{0.55}La_{0.055}Pr_{0.045}O_2$ phase and $Ce_{0.17}Zr_{0.73}La_{0.02}Nd_{0.04}Y_{0.04}O_2$ phase respectively.

Figure 4:
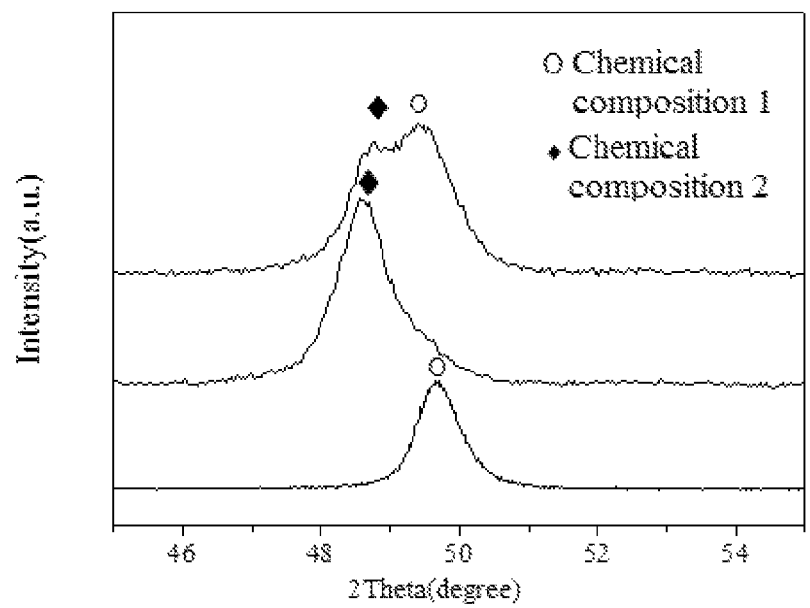
FIG. 4 shows an XRD pattern of a cerium-zirconium composite oxide provided in Embodiment 15 of the present disclosure.

After the above cerium-zirconium composite oxide is subjected to heat preservation at 1000° C. for 4 hours, it is found by the detection of the XRD pattern that: the proportion of the cerium-zirconium solid solution phase in which the chemical composition is $Ce_{0.35}Zr_{0.55}La_{0.055}Pr_{0.045}O_2$ is 50 vol %, and the cell parameters of $Ce_{0.35}Zr_{0.55}La_{0.055}Pr_{0.045}O_2$ phase are a=b=c=5.2615 Å, the cell parameters of $Ce_{0.17}Zr_{0.73}La_{0.02}Nd_{0.04}Y_{0.04}O_2$ phase is a=b=c=5.1532 Å, and there is a difference of 0.1083 Å between the cerium-zirconium solid solution phases with two different chemical compositions. As shown in FIG. 4, it is clear that the prepared cerium-zirconium composite oxide consists of the cerium-zirconium solid solution phases with two different structures.

At the same time, after being subjected to a reduction treatment at 800° C., the above cerium-zirconium composite oxide obtains an oxygen storage amount of being 660 $\mu molO_2/g$ at 500° C. after performing $O_2$ oxidative titration with a chemical adsorbent, more than a simple mathematics sum of the oxygen storage amount of two phases (the oxygen storage amount is 540 $\mu molO_2/g$ when $Ce_{0.35}Zr_{0.55}La_{0.055}Pr_{0.045}O_2$ cerium-zirconium solid solution phase exists separately, and the oxygen storage amount is 490 $\mu molO_2/g$ when $Ce_{0.17}Zr_{0.73}La_{0.02}Nd_{0.04}Y_{0.04}O_2$ cerium-zirconium solid solution phase exists separately).

The specific surface area of the cerium-zirconium composite oxide is tested with a specific surface area instrument after aging the above cerium-zirconium composite oxide at 1000° C. for 4 hours. The detecting result shows that the specific surface area of the composite oxide is kept at a high level (64.25 m²/g).

The detection method of the obtained cerium-zirconium composite oxide in the following Embodiments 16 to 19 is the same as that of Embodiment 15.

Embodiment 16

First, compounding is carried out at a molar ratio of Ce/Zr/La/Pr of 45:45:5.5:4.5 to obtain a first cerium-zirconium solid solution phase mixed solution C (with a volume of 3 L) of ammonium cerium nitrate, lanthanum nitrate, praseodymium nitrate and zirconyl nitrate at a concentration of 1.5 M; compounding is carried out at a molar ratio of Ce/Zr/Ni of 46:50:4 to obtain a second cerium-zirconium solid solution phase mixed solution D (with a volume of 1 L) of ammonium cerium nitrate, zirconyl nitrate and nickel nitrate at a concentration of 1.5 M;

Subsequently, the mixed solution C and mixed solution D are mixed with the sodium hydroxide solution of 3M one by one for precipitation reaction, the pH value of the reaction system is adjusted to about 9, the reaction time is 6 hours, and the reaction temperature is 50° C. to obtain the cerium-zirconium composite hydroxide precipitated slurry, the precipitated slurry is subjected to aging for 10 hours to obtain a cerium-zirconium composite hydroxide precipitated slurry, the precipitated slurry is subjected to filtration, washing and drying to obtain a precipitate; and finally, the precipitate is subjected to heat preservation at 600° C. for 5 hours to obtain a cerium-zirconium composite oxide.

It is determined in a manner of the XRD pattern peak separation that: the obtained cerium-zirconium composite oxide contains cerium-zirconium solid solution phase with two chemical compositions, and it is determined by the peak separation fitting and comparing analysis that its chemical compositions are $Ce_{0.45}Zr_{0.45}La_{0.055}Pr_{0.045}O_2$ phase and $Ce_{0.46}Zr_{0.50}Ni_{0.04}O_2$ phase.

After the above cerium-zirconium composite oxide is subjected to heat preservation at 1000° C. for 4 hours, it is found by the XRD detection that: the proportion of the cerium-zirconium solid solution phase in which the chemical composition is $Ce_{0.45}Zr_{0.45}La_{0.055}Pr_{0.045}O_2$ is 75 vol %, and the cell parameters of $Ce_{0.45}Zr_{0.45}La_{0.055}Pr_{0.045}O_2$ phase are a=b=c=5.2842 Å, the cell parameters of $Ce_{0.46}Zr_{0.50}Ni_{0.04}O_2$ phase are a=b=c=5.2742 Å, and there is a difference of 0.01 Å between the cell parameters.

After being subjected to a reduction treatment at 800° C., an oxygen storage amount of being 780 $\mu molO_2/g$ is obtained at 500° C. after performing $O_2$ oxidative titration with a chemical adsorbent.

The specific surface area of the cerium-zirconium composite oxide is tested with a specific surface area instrument after aging the above cerium-zirconium composite oxide at 1000° C. for 4 hours. The test shows that the specific surface area of the composite oxide is 58.25 m²/g.

Embodiment 17

First, compounding is carried out at a molar ratio of Ce/Zr/La of 85:12:3 to obtain a first cerium-zirconium solid solution phase mixed solution C (with a volume of 10 L) of ammonium cerium nitrate, lanthanum nitrate, and zirconyl nitrate at a concentration of 1.5 M; compounding is carried out at a molar ratio of Ce/Zr/Mn of 18:73:5 to obtain a second cerium-zirconium solid solution phase mixed solution D (with a volume of 10 L) of ammonium cerium nitrate, zirconyl nitrate and nickel nitrate at a concentration of 1.5 M;

Subsequently, the mixed solution C and ammonia solution with a mass fraction of 15% are mixed for precipitation reaction, the pH value of the reaction system is adjusted to about 9, the reaction time is 3 hours, and the reaction temperature is 60° C. After the reaction is finished, a small amount of the mixture feed liquid D and 15% of ammonia solution are added to the reaction system at the same time, the precipitated particles are surface modified and the pH of the reaction end point is adjusted to about 9 to obtain cerium-zirconium composite hydroxide precipitated slurry, the precipitated slurry is subjected to aging for 2 hours to obtain a cerium-zirconium composite hydroxide precipitated slurry, the precipitated slurry is subjected to filtration, washing and drying to obtain a precipitate; and finally, the precipitate is subjected to heat preservation at 800° C. for 2 hours to obtain a cerium-zirconium composite oxide.

It is determined in a manner of the XRD pattern peak separation that: the obtained cerium-zirconium composite oxide contains cerium-zirconium solid solution phase with two chemical compositions, and it is determined by the peak separation fitting and comparing analysis that its chemical compositions are $Ce_{0.85}Zr_{0.12}La_{0.03}O_2$ phase and $Ce_{0.18}Zr_{0.73}Mn_{0.05}O_2$ phase.

After the cerium-zirconium composite oxide is subjected to heat preservation at 1000° C. for 4 hours, it is found by the XRD pattern detection that it consists of $Ce_{0.85}Zr_{0.12}La_{0.03}O_2$ phase of 99.9 vol % and a very small amount of $Ce_{0.18}Zr_{0.73}Mn_{0.05}O_2$ phase (it is presumed that the cerium-zirconium solid solution phase with a chemical composition of $Ce_{0.18}Zr_{0.73}Mn_{0.05}O_2$ mainly plays the role of surface modification). The cell parameters of $Ce_{0.85}Zr_{0.12}La_{0.03}O_2$ phase are a=b=c=5.392 Å, the cell parameters of $Ce_{0.18}Zr_{0.73}Mn_{0.05}O_2$ phase are a=b=c=5.1503 Å, and there is a difference of 0.2422 Å.

At the same time, after being subjected to a reduction treatment at 800° C., an oxygen storage amount of being 800 μmol $O_2$/g is obtained at 500° C. after performing $O_2$ oxidative titration with a chemical adsorbent. The specific surface area is tested with a specific surface area instrument after aging at 1000° C. for 4 hours. The test shows that the specific surface area of the composite oxide is 59.34 m$^2$/g.

Embodiment 18

First, compounding is carried out at a molar ratio of Ce/Zr of 95:5 to obtain a first cerium-zirconium solid solution phase mixed solution C (with a volume of 3 L) of ammonium cerium nitrate and zirconyl nitrate at a concentration of 1.5 M; compounding is carried out at a molar ratio of Ce/Zr/Y of 4:93:3 to obtain a second cerium-zirconium solid solution phase mixed solution D (with a volume of 1 L) of ammonium cerium nitrate, zirconyl nitrate and yttrium nitrate at a concentration of 1.5 M;

Subsequently, the mixed solution C and mixed solution D are mixed with the sodium hydroxide solution of 3M one by one for precipitation reaction, the pH value of the reaction system is adjusted to about 11, the reaction time is 3 hours, and the reaction temperature is 50° C. to obtain the cerium-zirconium composite hydroxide precipitated slurry, the precipitated slurry is subjected to aging for 48 hours to obtain a cerium-zirconium composite hydroxide precipitated slurry, the precipitated slurry is subjected to filtration, washing and drying to obtain a precipitate; and finally, the precipitate is subjected to heat preservation at 600° C. for 6 hours to obtain a cerium-zirconium composite oxide.

It is found by the XRD detection that the obtained cerium-zirconium composite oxide contains cerium-zirconium solid solution phase with two chemical compositions, that is, $Ce_{0.95}Zr_{0.05}O_2$ phase and $Ce_{0.04}Zr_{0.93}Y_{0.03}O_2$ phase.

After the obtained cerium-zirconium composite oxide is subjected to heat preservation at 1000° C. for 4 hours, it is found by the XRD pattern peak separation fitting analysis that the proportion of the cerium-zirconium solid solution phase in which the chemical composition is $Ce_{0.95}Zr_{0.05}O_2$ is 75 vol %, and the cell parameters of $Ce_{0.95}Zr_{0.05}O_2$ phase are a=b=c=5.4103 Å, the cell parameters of $Ce_{0.04}Zr_{0.93}Y_{0.03}O_2$ phase are a=b=c=5.1283 Å, and there is a difference of 0.282 Å.

At the same time, after being subjected to a reduction treatment at 800° C., an oxygen storage amount of being 750 μmol$O_2$/g is obtained at 500° C. after performing $O_2$ oxidative titration with a chemical adsorbent. The specific surface area is tested with a specific surface area instrument after aging at 1000° C. for 4 hours. The test shows that the specific surface area of the composite oxide is 62.25 m$^2$/g.

Embodiment 19

First, compounding is carried out at a molar ratio of Ce/Zr/La of 62:30:8 for $Ce_{0.62}Zr_{0.30}La_{0.08}O_2$ to obtain a first cerium-zirconium solid solution phase mixed solution C (with a volume of 1 L) of ammonium cerium nitrate, lanthanum nitrate and zirconyl nitrate at a concentration of 1.5 M; compounding is carried out at a molar ratio of Ce/Zr/La/Pr of 35:55:5.5:4.5 to obtain a second cerium-zirconium solid solution phase mixed solution D (with a volume of 2 L) of ammonium cerium nitrate, lanthanum nitrate, praseodymium nitrate and zirconyl nitrate at a concentration of 1.5 M; and finally, compounding is carried out at a molar ratio of Ce/Zr/La/Nd/Y at a molar ratio of 17:73:2:4:4 to obtain a third cerium-zirconium solid solution phase mixed solution E (with a volume of 1 L) of ammonium cerium nitrate, lanthanum nitrate, neodymium nitrate, yttrium nitrate and zirconyl nitrate at a concentration of 1.5 M;

Subsequently, the mixed solution C, mixed solution D, and mixed solution E are mixed with the sodium hydroxide solution of 3M one by one for precipitation reaction, the pH value of the reaction system is adjusted to about 11, the reaction time is 8 hours, and the reaction temperature is 60° C. to obtain the cerium-zirconium composite hydroxide precipitated slurry, the precipitated slurry is charged into a high pressure reactor and subjected to hydrothermal aging at 150° C. for 12 hours to obtain a cerium-zirconium composite hydroxide precipitated slurry, the precipitated slurry is subjected to filtration, washing and drying to obtain a precipitate. Finally, the precipitate is subjected to heat preservation at 800° C. for 2 hours to obtain a cerium-zirconium composite oxide.

The XRD detection and data fitting analysis show that the cerium-zirconium composite oxide contains cerium-zirconium solid solution phase with three chemical compositions, and its chemical compositions are $Ce_{0.62}Zr_{0.30}La_{0.08}O_2$ phase, $Ce_{0.35}Zr_{0.55}La_{0.055}Pr_{0.045}O_2$ phase and $Ce_{0.17}Zr_{0.73}La_{0.02}Nd_{0.04}Y_{0.04}O_2$ phase. After the obtained cerium-zirconium composite oxide is subjected to heat preservation at 1000° C. for 4 hours, it is found by the XRD pattern peak separation fitting analysis that: the proportion of the three cerium-zirconium solid solution phases are 25 vol %, 50 vol % and 25 vol % respectively. The cell parameters with the chemical composition of $Ce_{0.62}Zr_{0.30}La_{0.05}O_2$ phase are a=b=c=5.3183 Å, the cell parameter with the chemical composition of $Ce_{0.35}Zr_{0.55}La_{0.055}Pr_{0.045}O_2$ phase are a=b=c=5.2615 Å, and the cell parameter with the chemical composition of $Ce_{0.17}Zr_{0.73}La_{0.02}Nd_{0.04}Y_{0.04}O_2$ phase are a=b=c=5.1532 Å. There is a difference of 0.01~0.282 Å between any two of the cerium-zirconium solid solution phases with three chemical compositions.

At the same time, after being subjected to a reduction treatment at 800° C., the above cerium-zirconium composite oxide obtains an oxygen storage amount of being 730 $\mu molO_2/g$ at 500° C. after performing $O_2$ oxidative titration with a chemical adsorbent. The specific surface area of the cerium-zirconium composite oxide is tested with a specific surface area instrument after aging the above cerium-zirconium composite oxide at 1000° C. for 4 hours. The detecting result shows that the specific surface area of the composite oxide is 61.78 $m^2/g$.

Meanwhile, in Embodiment 4, the present disclosure also performs XRD analysis of the cerium-zirconium composite oxide provided in Embodiment 4, and the XRD pattern thereof is as shown in FIG. 1. The cell parameters of cerium-zirconium composite oxide are obtained by XRD analysis. The result is as shown in Table 1. It can be seen from Table 1 that the structure of $Ce_{0.34}Zr_{0.56}La_{0.055}Pr_{0.045}O_2$ phase is the same as the structure of $CeO_2$ phase, and the lattice constant of $Ce_{0.34}Zr_{0.56}La_{0.055}Pr_{0.045}O_2$ phase and the lattice constant of $CeO_2$ phase are different.

TABLE 1

| Composition | $CeO_2$ phase | $Ce_{0.34}Zr_{0.56}La_{0.055}Pr_{0.045}O_2$ phase |
|---|---|---|
| Proportion % | 11 | 89 |
| cell parameters | a = b = c = 5.40285Å, $\alpha = \beta = \gamma = 90°$ | a = b = c = 5.24703Å, $\alpha = \beta = \gamma = 90°$ |

Figure 2:
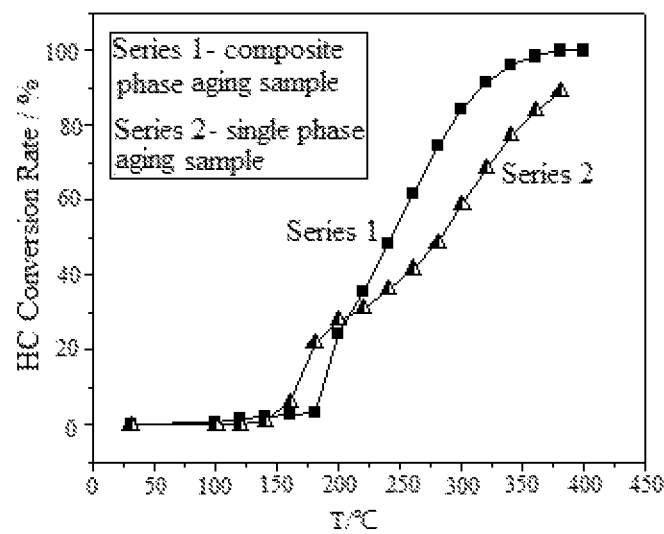
FIG. 2 shows a comparison diagram of a catalytic performance of a cerium-zirconium composite oxide (a composite phase) provided in Embodiment 4 of the present disclosure and a cerium-zirconium composite oxide (a single phase) provided by the prior art.

Similarly, in Embodiment 4, the present disclosure also performs catalytic performance test on a cerium-zirconium composite oxide (i.e., series 1 to composite phase aging sample in FIG. 2) provided in Embodiment 4 and a cerium-zirconium composite oxide (i.e., series 2 to single phase aging sample in FIG. 2) prepared according to the prior art in Embodiment 4. The test results are shown in FIG. 2. The test process is as follows: using the same volume loading method to load the precious metal palladium of the same mass fraction of 0.5%, roasting at 500° C. for 2 hours to activate, and carrying out the catalytic performance test on the catalytic activity evaluation system. As can be seen from FIG. 2, compared to the cerium-zirconium composite oxide (Series 2) prepared according to the prior art, the composite phase cerium-zirconium composite oxide (Series 1) has dropped by 45° C. for 50% of ignition temperature of HC (hydrocarbon), exhibiting a higher catalytic activity.

Figure 3:
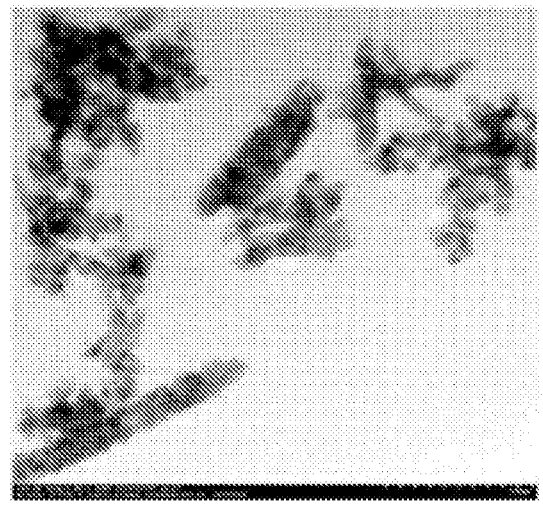
FIG. 3 shows a TEM pattern of a cerium-zirconium composite oxide provided in Embodiment 4 of the present disclosure.

The present disclosure also obtains a TEM pattern of the cerium-zirconium composite oxide provided for Embodiment 4 by a projection electron microscope, as shown in FIG. 3. As can be seen from FIG. 3, needle-like cerium oxide and near-spherical cerium-zirconium solid solution are present in the composite phase cerium-zirconium composite oxide provided by Embodiment 4, and two shapes of particles support each other and interact with each other.

As can be seen from the above embodiments, the above embodiments of the present disclosure have the following technical effects: the cerium-zirconium composite oxide provided by the present disclosure includes a cerium oxide phase and a cerium-zirconium solid solution phase. Since the cerium oxide phase and the cerium-zirconium solid solution phase have different cell parameters, the cerium oxide phase and the cerium zirconium solid solution phase have a different phase boundary. The cerium-zirconium composite oxide contains cerium oxide needle-like particles and cerium-zirconium solid solution near-spherical particles. Two shapes of particles form a support structure in the space, reducing the contact area of the sintered neck. The cerium-zirconium composite oxide has a high anti-sintering performance in the synergistic or coupled effect between the cerium oxide phase and the cerium-zirconium solid solution phase so that the high temperature stability of the cerium-zirconium composite oxide is improved. In addition, since the present disclosure has needle-like cerium oxide and near-spherical cerium-zirconium solid solution in the composite phase cerium-zirconium composite oxide, two shapes of particles support each other and interact with each other so that the cerium-zirconium composite oxide of the present disclosure has a high specific surface, has a good pore structure with good temperature resistance, and improves the oxygen storage capacity of the cerium-zirconium composite oxide, so that the catalyst prepared by the cerium-zirconium composite oxide of the disclosure has a good catalytic application performance and effect.

The foregoing is only a preferred embodiment of the present disclosure and not intended to limit the present disclosure, and for the technician of the field, the present disclosure may have various modifications and variations. Any modifications, equivalent replacements, improvements and the like within the spirit and principle of the present disclosure shall fall within the scope of protection as defined in the present disclosure.

What is claimed is:

1. A cerium-zirconium composite oxide, wherein the cerium-zirconium composite oxide has a composite phase structure, and comprises a cerium oxide phase and a cerium-zirconium solid solution phase, wherein the chemical formula of the cerium-zirconium solid solution phase is $Ce_xZr_{1-x-y}M_yO_2$, where M is at least one selected from the group consisting of a rare earth element other than cerium, a transition metal element and an alkaline earth metal element, x is 15-85 mol %, y is 0-20 mol %, and the cerium oxide phase has a proportion of 0.1-30 vol % in the cerium-zirconium composite oxide.

2. The cerium-zirconium composite oxide as claimed in claim 1, wherein after the cerium-zirconium composite oxide is subjected to heat preservation at 1000° C. for 4 hours, the cerium oxide phase has a proportion of 0.5-30 vol % in the cerium-zirconium composite oxide, preferably 3-20 vol %.

3. The cerium-zirconium composite oxide as claimed in claim 1, wherein the cerium-zirconium composite oxide comprises cerium oxide needle-like particles and cerium-zirconium solid solution near-spherical particles, and after being subjected to heat preservation at 1000° C. for 4 hours, the cerium oxide needle-like particles have a diameter of 7-20 nm and a length of 50-300 nm, the cerium-zirconium solid solution near-spherical particles have a diameter of 5-30 nm, and the cerium oxide needle-like particles have a volume ratio of 0.5-25% in the cerium-zirconium composite oxide.

4. The cerium-zirconium composite oxide as claimed in claim 1, wherein after being subjected to heat preservation at 1000° C. for 4 hours, the cerium-zirconium composite oxide has a pore size of 5-45 nm, preferably 10-40 nm, and after being subjected to heat preservation at 1000° C. for 4 hours, the cerium-zirconium composite oxide has a specific surface area of being more than 50 $m^2/g$.

5. The cerium-zirconium composite oxide as claimed in claim 1, wherein after being subjected to a reduction treatment at 800° C., the cerium-zirconium composite oxide has an oxygen storage amount of being more than 600 μmol $O_2$/g at 500° C.

6. The cerium-zirconium composite oxide as claimed in claim 1, wherein the rare earth element other than cerium is at least one selected from the group consisting of La, Pr, Nd, Y, Sm, Eu, Tb, and Yb; the transition metal element is at least one selected from the group consisting of Cu, Mn, and Ni; and the alkaline earth metal element is at least one selected from the group consisting of Mg, Ca, Sr, and Ba.

7. The cerium-zirconium composite oxide as claimed in claim 1, wherein the cerium-zirconium composite oxide is prepared by the following preparation method, wherein the preparation method comprises the steps of:
 Step S1: preparing a feed liquid A containing a tetravalent cerium ion, a zirconium ion and a doped metal ion at a composition ratio of the cerium-zirconium solid solution phase in the cerium-zirconium composite oxide, preparing a trivalent cerium ion solution at a proportion of the cerium oxide phase in the cerium-zirconium composite oxide, and adding a complex to the trivalent cerium ion solution to obtain a feed liquid B, wherein the doped metal ion is the M in the cerium-zirconium composite oxide, and the complex contains a coordination ion of the cerium ion;
 Step S2: adding the feed liquid A, the feed liquid B and a precipitant simultaneously to a reactor to be mixed for reaction, and adjusting the pH to 7-13 to obtain a precipitated slurry;
 Step S3: aging the precipitated slurry; and
 Step S4: obtaining a precipitate after the precipitated slurry being aged is subjected to solid-liquid separation, and obtaining the cerium-zirconium composite oxide after the precipitate is subjected to post-treatment.

8. The cerium-zirconium composite oxide as claimed in claim 7, wherein the complex is at least one selected from the group consisting of organic acid, an organic amine, and an aliphatic alcohol, and is preferably at least one selected from the group consisting of ethylenediaminetetraacetic acid, citric acid, acetic acid, salicylic acid, p-toluylic acid and stearyl alcohol.

9. The cerium-zirconium composite oxide as claimed in claim 7, wherein the complex has a used amount of 1-20%, preferably 3-10%, of the molar quantity of trivalent cerium ions in the trivalent cerium ion solution.

10. The cerium-zirconium composite oxide as claimed in claim 7, wherein the precipitant comprises at least one selected from the group consisting of magnesium carbonate solution, hydroxide of at least one element of ammonium, sodium and potassium, carbonate, and bicarbonate, preferably at least one selected from the group consisting of sodium hydroxide, ammonia and ammonium bicarbonate.

11. The cerium-zirconium composite oxide as claimed in claim 7, wherein in the Step S2, a precipitation reaction temperature is 25-95° C. and a reaction time is 0.5-10 hrs.

12. The cerium-zirconium composite oxide as claimed in claim 7, wherein in the Step S2, adjusting the pH to 8-10.

13. The cerium-zirconium composite oxide as claimed in claim 7, wherein in the Step S3, an aging temperature is 50-300° C. and an aging time is 3 hrs or more.

14. The cerium-zirconium composite oxide as claimed in claim 7, wherein the post-treatment comprises at least one step selected from the group consisting of drying, roasting and grading steps; when the post-treatment comprises the roasting, a roasting temperature is 500-800° C., and a roasting time is 1-10 hrs.

15. The cerium-zirconium composite oxide as claimed in claim 1, wherein the cerium-zirconium composite oxide is an oxide applied in a catalyst, wherein the catalyst is applied to vehicle exhaust gas purification, natural gas catalytic combustion, organic waste gas purification treatment and industrial waste gas denitrification treatment.

16. A cerium-zirconium composite oxide, wherein the cerium-zirconium composite oxide consists of two or more cerium-zirconium solid solution phases with different crystal structures and different chemical compositions, wherein the chemical formula of the cerium-zirconium solid solution phase is $Ce_xZr_{1-x-y}M_yO_2$, where M is at least one selected from the group consisting of a rare earth element other than cerium, a transition metal element and an alkaline earth metal element, x is 15-85 mol %, and y is 0-20 mol %, and at least one of cerium-zirconium solid solution has a proportion of 0.1-99.9 vol % in the cerium-zirconium composite oxide.

17. The cerium-zirconium composite oxide as claimed in claim 16, wherein the cerium-zirconium composite oxide consists of two or more cerium-zirconium solid solution phases of a cubic crystal system, cell parameters of the cubic crystal system are in the range of 5.4103 Å≥a=b=c≥5.1283 Å, and there is a difference of 0.01-0.282 Å between the cell parameters of any two of the cubic crystal systems.

18. The cerium-zirconium composite oxide as claimed in claim 16, wherein the rare earth element other than cerium is at least one selected from the group consisting of La, Pr, Nd, Y, Sm, Eu, Tb, and Yb; the transition metal element is at least one selected from the group consisting of Cu, Mn, and Ni; and the alkaline earth metal element is at least one selected from the group consisting of Mg, Ca, Sr, and Ba.

19. The cerium-zirconium composite oxide as claimed in claim 16, wherein the cerium-zirconium composite oxide is prepared by following a preparation method, wherein the preparation method comprises the steps of:
 Step S1: preparing each cerium-zirconium solid solution feed liquid at a composition ratio of the cerium-zirconium solid solution phase in the cerium-zirconium complex oxide, wherein each of the cerium-zirconium solid solution feed liquid comprises a tetravalent cerium ion, a zirconium ion and a doped metal ion, wherein the doped metal ion is the M in the cerium-zirconium complex oxide;
 Step S2: performing a precipitation reaction of each of the cerium-zirconium solid solution feed liquid with a precipitant one by one, and adjusting the pH to 7-13 to obtain a precipitated slurry;
 Step S3: aging the precipitated slurry; and
 Step S4: obtaining a precipitate after the precipitated slurry being aged is subjected to solid-liquid separation, and obtaining the cerium-zirconium composite oxide after the precipitate is subjected to post-treatment.

* * * * *